(12) United States Patent
Tanaka et al.

(10) Patent No.: US 10,008,725 B2
(45) Date of Patent: Jun. 26, 2018

(54) METAL-OXYGEN CELL

(71) Applicant: HONDA MOTOR CO., LTD., Minato-Ku, Tokyo (JP)

(72) Inventors: Akihisa Tanaka, Saitama (JP); Kiyoshi Tanaami, Saitama (JP); Bunichi Saito, Saitama (JP); Takuya Taniuchi, Saitama (JP); Hiroshi Sakai, Saitama (JP); Satoshi Nakada, Saitama (JP); Mao Hori, Saitama (JP); Tomohiro Kinoshita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 769 days.

(21) Appl. No.: 14/388,139

(22) PCT Filed: Mar. 15, 2013

(86) PCT No.: PCT/JP2013/057506
§ 371 (c)(1),
(2) Date: Sep. 25, 2014

(87) PCT Pub. No.: WO2013/146383
PCT Pub. Date: Oct. 3, 2013

(65) Prior Publication Data
US 2015/0037670 A1 Feb. 5, 2015

(30) Foreign Application Priority Data

Mar. 29, 2012 (JP) .................................. 2012-077981

(51) Int. Cl.
*H01M 8/22* (2006.01)
*H01M 4/62* (2006.01)
(Continued)

(52) U.S. Cl.
CPC ........... *H01M 4/628* (2013.01); *H01M 4/131* (2013.01); *H01M 4/38* (2013.01); *H01M 4/381* (2013.01);
(Continued)

(58) Field of Classification Search
CPC ........ H01M 4/628; H01M 4/131; H01M 4/38; H01M 4/381; H01M 4/382; H01M 4/463; H01M 4/466
(Continued)

(56) References Cited

U.S. PATENT DOCUMENTS

2010/0178543 A1* 7/2010 Gruner ................... B82Y 30/00
                                                      429/121
2010/0291443 A1   11/2010 Farmer
2013/0011754 A1    1/2013 Tanaami et al.

FOREIGN PATENT DOCUMENTS

JP    09-259942 A    10/1997
JP    2006-172720 A   6/2006
(Continued)

OTHER PUBLICATIONS

Lim, H. K., S. O. Lee, K. J. Song, S. G. Kim, and K. H. Kim. "Synthesis and Properties of Soluble Polypyrrole Doped with Dodecylbenzenesulfonate and Combined with Polymeric Additive Poly(ethylene Glycol)." Journal of Applied Polymer Science 97.3 (2005): 1170-175. Web.*

*Primary Examiner* — Magali P Slawski
*Assistant Examiner* — Kourtney Salzman Carlson
(74) *Attorney, Agent, or Firm* — Carrier Blackman & Associates, P.C.; Joseph P. Carrier; Jingli Wang

(57) ABSTRACT

A metal-oxygen cell capable of improving cycle performance is provided. The metal-oxygen cell 1 includes a positive electrode 2 that contains an oxygen storage material and uses oxygen as an active material, a negative electrode (Continued)

3 that uses a metal as an active material, and an electrolyte layer 4 sandwiched between the positive electrode 2 and the negative electrode 3 and containing an electrolyte solution, effecting cell reactions of the positive electrode 2 on a surface of the oxygen storage material. The positive electrode 2 contains a conductive polymer that is capable of suppressing permeation of oxygen and conducting metal ions and covers at least a part of the surface of the oxygen storage material.

5 Claims, 5 Drawing Sheets

(51) Int. Cl.
| | |
|---|---|
| *H01M 12/08* | (2006.01) |
| *H01M 4/131* | (2010.01) |
| *H01M 4/38* | (2006.01) |
| *H01M 4/46* | (2006.01) |
| *H01M 4/485* | (2010.01) |
| *H01M 4/86* | (2006.01) |
| *H01M 4/02* | (2006.01) |
| *H01M 8/04082* | (2016.01) |

(52) U.S. Cl.
CPC .......... *H01M 4/382* (2013.01); *H01M 4/463* (2013.01); *H01M 4/466* (2013.01); *H01M 4/485* (2013.01); *H01M 4/8605* (2013.01); *H01M 4/8663* (2013.01); *H01M 12/08* (2013.01); *H01M 8/04216* (2013.01); *H01M 2004/027* (2013.01); *H01M 2004/028* (2013.01); *Y02E 60/128* (2013.01)

(58) Field of Classification Search
USPC .............................. 429/209–213, 215, 218.1
See application file for complete search history.

(56) References Cited

FOREIGN PATENT DOCUMENTS

| | | |
|---|---|---|
| JP | 2009-230985 A | 10/2009 |
| JP | 2013-062182 A | 4/2013 |
| WO | 2010/061452 A1 | 6/2010 |
| WO | 2011/115176 A1 | 9/2011 |
| WO | 2012/029743 A1 | 3/2012 |

* cited by examiner

METAL-OXYGEN CELL

TECHNICAL FIELD

The present invention relates to a metal-oxygen cell.

BACKGROUND ART

Conventionally, there has been known a metal-oxygen cell comprising a positive electrode that uses oxygen as an active material, a negative electrode that uses a metal as an active material, and an electrolyte layer sandwiched between the positive electrode and the negative electrode and containing an electrolyte solution.

In the metal-oxygen cell, at the time of discharging, in the negative electrode, the metal is oxidized to generate metal ions, and the metal ions are conducted to the electrolyte layer and move to the positive electrode side. Meanwhile, in the positive electrode, oxygen is reduced to generate oxygen ions, the oxygen ions are bonded to the metal ions to generate a metal oxide. In addition, in the metal-oxygen cell, at the time of charging, in the negative electrode and the positive electrode, a reaction reverse to the reaction occurs.

In the metal-oxygen cell, when a metallic lithium is used as the metal, a large charge-discharge capacity can be obtained, because the metallic lithium has a high theoretical voltage and a large electrochemical equivalent. Further, when oxygen in the air is used as the oxygen, the energy density of the cell per mass can be increased, because there is no need to fill the cell with a positive electrode active material.

However, when the positive electrode is exposed to air in order to use oxygen in the air as a positive electrode active material, a problem is that the electrolyte layer, the negative electrode and the like deteriorate due to intrusion of moisture, carbon dioxides etc. in the air into the cell. Then, in order to solve the problem, there is known a metal-oxygen cell comprising a positive electrode containing an oxygen-occluding material that deintercalates oxygen by light-receiving, a negative electrode comprising a metallic lithium, an electrolyte layer sandwiched between the positive electrode and the negative electrode and containing an electrolyte solution, wherein the positive electrode, the negative electrode and the electrolyte layer are sealed and housed in a housing having a light transmission unit configured to guide light to the oxygen-occluding material (for example, see Patent Literature 1).

Furthermore, as a positive electrode material of the metal-oxygen cell, instead of using the oxygen-occluding material that needs light receiving, use of an oxygen storage material capable of chemically occluding oxygen in the inside thereof and releasing oxygen therefrom or capable of physically adsorbing oxygen on the surface thereof and desorbing oxygen from the surface thereof without the need of light receiving is studied.

CITATION LIST

Patent Literature

Patent Literature 1: Japanese Patent Application Laid-Open No. 2009-230985

SUMMARY OF INVENTION

Technical Problem

However, a disadvantage of a metal-oxygen cell using the oxygen storage material as a positive electrode material is that it is difficult to obtain sufficient cycle performance.

An object of the present invention is to provide a metal-oxygen cell capable of resolving the inconvenience and improving the cycle performance.

Solution to Problem

The present inventors have carried out extensive studies and examinations over the reason for the incapability of obtaining sufficient cycle performance in the metal-oxygen cell and have found that the reason is because an electrolyte solution contained in the electrolyte layer is decomposed by active oxygen generated in cell reactions.

That is, in the positive electrode in the metal-oxygen cell, when oxygen is reduced at the time of discharging to generate oxygen ions or when oxygen ions are oxidized at the time of charging to generate oxygen, active oxygen is generated as an intermediate product. An electrolyte solution contained in the electrolyte layer is decomposed by the active oxygen, and components generated by the decomposition bond to the metal ions to generate a metal compound. It can be considered that since the metal compound is not decomposed in cell reactions, and as a result of a reduction in metal ions utilized in the cell reactions, sufficient cycle performance cannot be obtained.

The present invention has been made on the basis of the findings, and in order to achieve the object, the present invention provides a metal-oxygen cell comprising a positive electrode that contains an oxygen storage material and uses oxygen as an active material, a negative electrode that uses a metal as an active material, and an electrolyte layer sandwiched between the positive electrode and the negative electrode and containing an electrolyte solution, effecting cell reactions of the positive electrode on a surface of the oxygen storage material, wherein the positive electrode contains a conductive polymer that is capable of suppressing permeation of oxygen and capable of conducting metal ions and covers at least a part of the surface of the oxygen storage material.

Generally, in a metal-oxygen cell, at the time of discharging, in a negative electrode, a metal is oxidized to generate metal ions, and the metal ions are conducted to the electrolyte layer and move to the positive electrode side. Meanwhile, in a positive electrode, at the time of discharging, oxygen is deintercalated from an oxygen storage material, and the oxygen is reduced to generate oxygen ions. At this time, active oxygen is generated as an intermediate product. Then, the oxygen ions bond to the metal ions to generate a metal oxide. Further, at the time of charging, in the negative electrode and the positive electrode, a reaction reverse to the reaction occurs. Among these cell reactions, in reactions caused in the positive electrode, the surface of the oxygen storage material becomes a reaction field.

In the metal-oxygen cell of the present invention, since the oxygen storage material is covered, at at least a part of the surface thereof, with a conductive polymer capable of suppressing permeation of oxygen, the active oxygen can be entrapped in the inside of a coating film comprising the conductive polymer. With this, decomposition of the electrolyte solution contained in the electrolyte layer caused by the active oxygen can be minimized, that is, it is possible to suppress the permeation of the active oxygen to the conductive polymer and to react with the electrolyte solution. As a result of this, it is possible to suppress the bonding components generated by decomposition of the electrolyte solution to the metal ions to generate a metal compound, and is possible to minimize the reduction of metal ions utilized in cell reactions.

Further, since the oxygen storage material is covered with the conductive polymer capable of suppressing the permeation of oxygen, oxygen ions deintercalated from the oxygen storage material can be entrapped in the inside of a coating film comprising the conductive polymer and can be retained in the vicinity of the surface of the oxygen storage material. As a result of this, since oxygen ions deintercalated from the oxygen storage material are not dissociated from the surface of the oxygen storage material, it is possible to prevent the reduction of oxygen utilized in cell reactions.

Furthermore, since the conducting polymer covering the oxygen storage material can sufficiently conduct metal ions, the conductive polymer does not prevent the cell reactions.

In the metal-oxygen cell, in reactions caused in the positive electrode, the surface of the oxygen storage material becomes a reaction field. Therefore, it can be considered that if the surface of the oxygen storage material is exposed without being covered at all and when a metal oxide generated by discharging is dissociated from the surface of the oxygen storage material, the metal oxide is not decomposed into oxygen ions and metal ions at the time of charging. In this case, it can be considered that at the time of charging, the amount of metal ions returning to the negative electrode decreases, and this causes a reduction in the charge-discharge capacity.

However, in the metal-oxygen cell of the present invention, the oxygen storage material is covered with the conductive polymer at at least a part of the surface thereof, the metal oxide generated in the discharging can be retained between the oxygen storage material and the coating film comprising the conductive polymer, i.e., on the surface of the oxygen storage material, serving as a reaction field.

Therefore, according to the metal-oxygen cell of the present invention, it is possible to prevent a reduction in the charge-discharge capacity and improve the cycle performance.

Further, it is preferred that in the metal-oxygen cell of the present invention, the conductive polymer have an oxygen permeability in the range of $10^{-12}$ to $10^{-8}$ cm$^3$/(cm$^2$·s·Pa). If the oxygen permeability is smaller than $10^{-12}$ cm$^3$/(cm$^2$·s·Pa), space between molecules becomes small, so that there may be cases where lithium ion may not be conducted. Meanwhile, when the oxygen permeability is more than $10^{-8}$ cm$^3$/(cm$^2$·s·Pa), there may be cases where the oxygen permeation amount increases and the decomposition of the electrolyte solution by the active oxygen cannot be suppressed.

Further, it is preferred that in the metal-oxygen cell of the present invention, in order not to inhibit cell reactions for the reason that the surface of the oxygen storage material is covered with the conductive polymer, the conductive polymer have an electrical conductivity in the range of $2 \times 10^{-7}$ to $10^4$ S/cm when the conductive polymer is present on the surface of the oxygen storage material. When the electrical conductivity is less than $2 \times 10^{-7}$ S/cm, there may be cases where electrons are not adequately conducted and this inhibits the cell reactions. Meanwhile, it is technically difficult to bring the electrical conductivity to be more than $10^4$ S/cm.

Furthermore, it is preferred that in the oxygen cell of the present invention, in order not to inhibit cell reactions for the reason that the surface of the oxygen storage material is covered with the conductive polymer, the conductive polymer have a metal ion conductivity in the range of $10^{-7}$ S/cm when the conductive polymer is present on the surface of the oxygen storage material. When the metal ion conductivity is less than $10^{-7}$ S/cm, there may be cases where metal ions are not sufficiently conducted and this inhibits the cell reactions. Meanwhile, it is technically difficult to bring the metal ion conductivity to be more than 1 S/cm.

In the metal-oxygen cell of the present invention, at the time of discharging, as the metal oxide is generated on the surface of the oxygen storage material, the positive electrode expands, and at the time of charging, as the metal oxide is decomposed, the positive electrode shrinks.

Then, it is preferred that in the metal-oxygen cell of the present invention, the conductive polymer has a Young's modulus in the range of 0.1 to 1000 MPa when the conductive polymer is present on the surface of the oxygen storage material. According to the metal-oxygen cell using the conductive polymer having a Young's modulus in the range described above, a coating film comprising the conductive polymer can have flexibility and becomes deformed by following the expansion-shrinkage of the positive electrode associated with generation and decomposition of the metal oxide, and can maintain its film structure.

When the Young's modulus is less than 0.1 MPa, there may be cases where the metal oxide generated at the time of discharging cannot be retained on the surface of the oxygen storage material serving as a reaction field. Meanwhile, when the Young's modulus is more than 1000 MPa, there may be cases where a coating film comprising the conductive polymer cannot have sufficient flexibility, and this inhibits generation of the metal oxide.

In the metal-oxygen cell of the present invention, as the conductive polymer, for example, poly(3,4-ethylenedioxythiophene) containing a dodecylbenzene sulfonic acid as a dopant can be used.

Further, it is preferred that in the metal-oxygen cell of the present invention, the oxygen storage material be provided with the ability to catalyze cell reactions. In this case, it is possible to accelerate the cell reactions. As the oxygen storage material, it is possible to use a composite metal oxide containing Y and Mn.

Further, it is preferred that in the metal-oxygen cell of the present invention, the positive electrode contain a conduction aid having electron conductivity. In this case, it is possible to improve the charge-discharge efficiency of the cell by reducing the internal resistance of the positive electrode to lower overvoltage.

Furthermore, in the metal-oxygen cell of the present invention, as the negative electrode, it is possible to use a negative electrode comprising any of one metal selected from a group consisting of Li, Zn, Al, Mg, Fe, Ca, Na, and K, an alloy of the metal, an organometal compound containing the metal or an organic complex of the metal.

DESCRIPTION OF EMBODIMENTS

Next, embodiments of the present invention will be further described in detail with reference to the drawings attached herewith.

Figure 1:
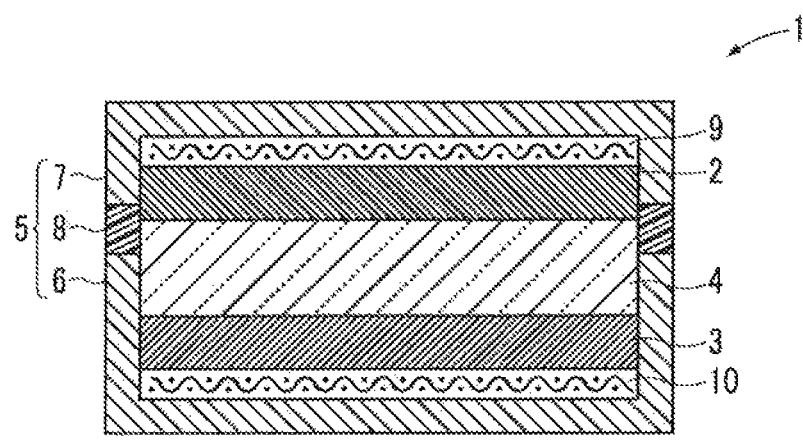
FIG. 1 is an illustrative cross-sectional view showing one configuration example of the metal-oxygen cell of the present invention.

As shown in FIG. 1, a metal-oxygen cell 1 in the present embodiment comprises a positive electrode 2 that contains an oxygen storage material and uses oxygen as an active material, a negative electrode 3 that uses a metal as an active material, and an electrolyte layer 4 sandwiched between the positive electrode 2 and the negative electrode 3 and containing an electrolyte solution, effecting cell reactions of the positive electrode 2 on a surface of the oxygen storage material in association with charging-discharging.

The positive electrode 2, negative electrode 3 and electrolyte layer 4 are hermetically sealed and housed in a case 5. The case 5 comprises a cup-formed case body 6, a lid 7 configured to cover the case body 6, and a ring shaped insulating resin 8 sandwiched between the case body 6 and the lid 7.

The positive electrode 2 comprises a positive electrode collector 9 placed under the top surface of the lid 7, and the negative electrode 3 comprises a negative electrode collector 10 placed on the bottom surface of the case body 6. Note that in the metal-oxygen cell 1, the case body 6 acts as a negative electrode plate, and the lid 7 acts as a positive electrode plate.

In the metal-oxygen cell 1, the positive electrode 2 comprises in addition to the oxygen storage material, a conductive polymer for covering at least a part of a surface of the oxygen storage material, a conduction aid having electron conductivity and a binder.

The oxygen storage material has the oxygen storage capability of storing oxygen therein at the time of charging and releasing oxygen therefrom at the time of discharging and has the ability to catalyze cell reactions.

Examples of the oxygen storage material include composite metal oxides having a hexagonal structure, C-rare-earth structure, apatite structure, delafosite structure, fluorite structure, perovskite structure or the like, and particularly, it is preferred that the oxygen storage material be a composite metal oxide containing Y and Mn.

The conductive polymer has an oxygen permeability in the range of $10^{-12}$ to $10^{-8}$ $cm^3/(cm^2 \cdot s \cdot Pa)$ and is capable of suppressing the permeation of oxygen. In addition, when the conductive polymer is present on the surface of the oxygen storage material, the conductive polymer has an electrical conductivity in the range of $2 \times 10^{-7}$ to $10^4$ S/cm as well as a lithium ion conductivity in the range of $10^{-7}$ to 1 S/cm, and is capable of excellently conducting electrons and lithium ions. Further, when the conductive polymer is present on the surface of the oxygen storage material, the conductive polymer has a Young's modulus in the range of 0.1 to 1000 MPa and is provided with excellent flexibility. Note that the electrical conductivity, the lithium ion conductivity and the Young's modulus of the conductive polymer when it is present on the surface of the oxygen storage material can be ascertained by measuring an electrical conductivity, a lithium ion conductivity and a Young's modulus of the oxygen storage material that is covered with the conductive polymer at at least a part of the surface thereof.

As the conductive polymer, it is possible to use, for example, poly(3,4-ethylenedioxythiophene) (PEDOT/DBS polymer) containing a dodecylbenzene sulfonic acid as a dopant, poly(3,4-ethylenedioxythiophene) (PEDOT/ToS polymer) containing a p-toluenesulfonic acid as a dopant, and the like. In this embodiment, the case of using a PEDOT/DBS polymer as the conductive polymer will be described as an example.

Examples of the conduction aid include carbon materials such as graphite, acetylene black, Ketjen black, carbon nanotube, mesoporous carbon, and carbon fiber or the like.

Examples of the binder include carboxymethylcellulose (CMC), polytetrafluoroethylene (PTFE), polyvinylidene fluoride (PVDF), polyvinyl alcohol (PVA), styrene butadiene rubber (SBR), and polyimide (PI) or the like.

The positive electrode 2 is produced in the following manner. First, iron (III) chloride as an oxidizer is dissolved in methanol to obtain an iron chloride solution. Next, in the iron chloride solution, a DBS solution prepared by dissolving a dodecylbenzene sulfonic acid (DBS) serving as dopant ions in methanol is mixed, and then the oxygen storage material is further mixed and stirred.

Next, in the iron chloride solution in which the DBS solution and the oxygen storage material have been mixed, an EDOT solution prepared by dissolving 3,4-ethylenedioxythiophene (EDOT) in methanol is mixed and heated to form poly(3,4-ethylenedioxythiophene) (PEDOT/DBS polymer) containing a dodecylbenzene sulfonic acid as a dopant, utilizing a surface of the oxygen storage material as a reaction field.

Next, the heated mixture solution is cooled to room temperature, followed by subjecting to solid-liquid separation, and the resulting solid component is washed and dried. With the above-mentioned process, it is possible to obtain an oxygen storage material in which at least a part of the surface thereof covered with the conductive polymer comprising the PEDOT/DBS polymer.

Next, the oxygen storage material covered in which at least a part of the surface thereof covered with the conductive polymer is mixed with the binder, and further the conduction aid is mixed therein to thereby obtain a positive electrode mixture. Next, the resulting positive electrode mixture is applied to one surface of a positive electrode collector 9 and dried to thereby obtain a positive electrode 2.

Examples of the negative electrode 3 include negative electrodes comprising any of one metal selected from a group consisting of Li, Zn, Al, Mg, Fe, Ca, Na, and K, an alloy of the metal, an organometal compound containing the metal or an organic complex of the metal. In this embodiment, the case of using a metallic lithium as the negative electrode will be described as an example.

As the electrolyte layer 4, for example, one obtained by impregnating a separator with a nonaqueous electrolyte solution can be used.

As the nonaqueous electrolyte solution, for example, one formed by dissolving a lithium salt in a nonaqueous solvent can be used. Examples of the lithium salt include carbonate, nitrate, and acetate or the like. Examples of the nonaqueous solvent include carbonic ester solvents, ether solvents, and ionic liquids or the like.

Examples of the separator include glass fibers, glass papers, polypropylene non-woven fabrics, polyimide non-woven fabrics, polyphenylene sulfide non-woven fabrics, and polyethylene porous films or the like, and it is possible to use those having a thickness of 40 μm to 1000 μm.

As the positive electrode collector 9, a mesh, foam, porous medium, metal foil, etc. formed of a metal having an action of collecting electrons, such as Al, Ti, stainless steel, Ni, and Cu or the like can be used.

Examples of the negative electrode collector 10 include stainless steel plates.

In the metal-oxygen cell 1 of this embodiment, at the time of discharging, as shown in the following formulae, in the negative electrode 3, lithium is oxidized to generate lithium ions, and the lithium ions conduct the electrolyte layer 4 and move to the positive electrode 2 side. Meanwhile, in the positive electrode 2, oxygen is reduced to generate oxygen ions, and the oxygen ions bond to the lithium ions to deposit a lithium oxide (lithium oxide or lithium peroxide) as a reaction product. Then, by connecting the negative electrode 3 and the positive electrode 2 with a conductor wire, electrical energy can be extracted. When oxygen is reduced to generate oxygen ions, active oxygen is generated as an intermediate product.

(Negative electrode) $4Li \rightarrow 4Li^+ + 4e^-$ (Positive electrode) $O_2 + 4e^- \rightarrow 2O^{2-}$ $4Li^+ + 2O^{2-} \rightarrow 2Li_2O$ $2Li^+ + 2O^{2-} \rightarrow Li_2O_2$ At the time of charging, in the positive electrode 2, the lithium oxide deposited by the discharging is decomposed to generate lithium ions and oxygen ions. The generated lithium ions conduct the electrolyte layer 4 and move to the negative electrode 3 side. Meanwhile, in the negative electrode 3, the lithium ions having been moved to the negative electrode 3 side are reduced to deposit lithium on the negative electrode 3.

(Positive electrode) $2Li_2O \rightarrow 4Li^+ + 2O^{2-}$ $Li_2O_2 \rightarrow 2Li^+ + 2O^{2-}$ (Negative electrode) $4Li^+ + 4e^- \rightarrow 4Li$ In the metal-oxygen cell 1 of this embodiment, since at least a part of the surface of the oxygen storage material is covered with the conductive polymer having an oxygen permeability in the above-mentioned range and capable of suppressing permeation of oxygen, the active oxygen can be entrapped in the inside of a coating film comprising the conductive polymer. With this configuration, the decomposition of the electrolyte solution contained in the electrolyte layer 4 caused by the active oxygen can be suppressed, and therefore, it is possible to prevent components generated by the decomposition of the electrolyte solution from bonding to lithium ions to generate a lithium compound and it is possible to minimize a reduction in lithium ions utilized in cell reactions.

Further, since the oxygen storage material is covered with the conductive polymer capable of suppressing permeation of oxygen, it is possible to entrap oxygen ions deintercalated from the oxygen storage material in the inside of a coating film comprising the conductive polymer and to retain the oxygen ions in the vicinity of the surface of the oxygen storage material. As a result of this, since oxygen ions discharged from the oxygen storage material do not come away from the surface of the oxygen storage material, it is possible to prevent a reduction of oxygen utilized in cell reactions.

In addition, since the conductive polymer that covers the oxygen storage material has an electrical conductivity and a lithium ion conductivity in the above mentioned ranges and is capable of excellently conducting electrons and lithium ions, it does not prevent the cell reactions.

Further, since the oxygen storage material is covered, at least a part of the surface thereof, with the conductive polymer, it is possible to retain the metal oxide generated at the time of discharging between the oxygen storage material and a coating film comprising the conductive polymer, i.e., on a surface of the oxygen storage material serving as a reaction field.

Therefore, according to the metal-oxygen cell 1 of this embodiment, it is possible to prevent a reduction in charge-discharge capacity and to improve the cycle performance.

Further, in the metal-oxygen cell 1 of this embodiment, since the conductive polymer that covers the surface of the oxygen storage material has a Young's modulus in the above mentioned range, the coating film comprising the conductive polymer can have flexibility. As a result of this, the conductive polymer (the coating film) becomes deformed by following the expansion-shrinkage of the positive electrode 2 associated with generation and decomposition of a lithium oxide, and can maintain its film structure.

Further in the metal-oxygen cell 1 of this embodiment, since the oxygen storage material is provided with the ability to catalyze cell reactions, it is possible to accelerate the cell reactions.

Furthermore, in the metal-oxygen cell 1 of this embodiment, since the positive electrode 2 contains a conduction aid having electron conductivity, it is possible to improve the charge-discharge efficiency of the cell by reducing the internal resistance of the positive electrode 2 to lower overvoltage.

Next, an Example of the present invention and a Comparative Example will be described.

EXAMPLE

Example

In this Example, first, yttrium nitrate 5-hydrate, manganese nitrate-6 hydrate and malic acid were pulverized and mixed so that the molar ratio was 1:1:6, to obtain a mixture. Next, the obtained mixture was reacted at a temperature of 250° C. for 30 minutes, further reacted at a temperature of 300° C. for 30 minutes, and still further reacted at a temperature of 350° C. for 1 hour. Next, the obtained reaction product was pulverized and mixed, and then burned at a temperature of 1000° C. for 1 hour to thereby obtain an oxygen storage material comprising a composite metal oxide represented by chemical formula of $YMnO_3$. The oxygen storage material has the oxygen storage capability of storing oxygen therein at the time of charging and releasing oxygen therefrom at the time of discharging and has the catalytic activity with respect to cell reactions.

Next, iron (III) chloride 1.3 mmol (0.211 g) being used as an oxidizer was dissolved in 10 mL of methanol, and insolubles were removed by a filter paper (pore size: 1 μm) to obtain an iron chloride solution.

4 mmol (1.31 g) of dodecylbenzene sulfonic acid (DBS) being used as a dopant ion was dissolved in 10 mL of methanol to obtain a DBS solution.

Next, the obtained iron chloride solution and the dodecylbenzene sulfonic acid solution were mixed, and then 2 g of the obtained oxygen storage material was added thereto and stirred.

Next, 1 mmol (0.142 g) of 3,4-ethylenedioxythiophene (EDOT) was dissolved in 10 mL of methanol to obtain an EDOT solution.

Next, the obtained EDOT solution was mixed with the iron chloride solution in which the DBS solution and the oxygen storage material had been mixed, stirred for 10 minutes, and then heated at a temperature of 85° C. while being stirred for 2 hours.

Next, the heated mixture solution was cooled to room temperature, subjected to solid-liquid separation, and the obtained solid component was separated on a filter paper (pore size: 1 μm). Next, the separated solid component was washed with methanol, water, ethanol, diethyl carbonate and ethanol in this order to thereby remove unreacted products contained in the solid component.

Next, the solid component separated from the unreacted products was vacuum-dried at a temperature of 120° C. With the above-mentioned process, 1.9 g of an oxygen storage material with at least a part of the surface thereof being covered with a conductive polymer was obtained. The conductive polymer was found to form a PEDOT/DBS polymer.

Next, 400 mg of the oxygen storage material with at least a part of the surface thereof being covered with the conductive polymer and 10 g of a CMC aqueous solution containing 1% by mass carboxymethyl cellulose (CMC, product name: MAC350HC, produced by NIPPON PAPER Chemicals Co., Ltd.) being used as a binder were mixed in a mortar. Next, in the mixture of the oxygen storage material with the CMC aqueous solution, 400 mg of Ketjen black (product name: EC600JD, produced by Lion Corporation, average particle diameter: 34 nm (primary particle)) being used as a conduction aid, 2 mL of water and 1 mL of ethanol were mixed, followed by stirring at 5000 rpm for 2 hours using a homogenizer to thereby obtain a slurry positive electrode mixture.

Next, the obtained positive electrode mixture was applied to an aluminum mesh (thickness: 2 mm, porosity: 75%) serving as a positive electrode collector 9, dried under pressure of 100 Pa or lower for 12 hours using a vacuum drier, and then punched out by a punch having a diameter of 15 mm to thereby form a positive electrode 2.

Next, in the inside of an SUS case body 6 having a closed-end cylindrical shape and having an inner diameter of 15 mm, a negative electrode collector 10 formed of a copper mesh having a diameter of 15 mm was placed, and on the negative electrode collector 10, a negative electrode 3 formed of a metallic lithium having a diameter of 15 mm and a thickness of 0.1 mm was superimposed.

Next, on the negative electrode 3, two sheets of separators formed of a non-woven fabric having a diameter of 15 mm (produced by Tapyrus Co., Ltd., average fiber diameter: 15 μm, thickness: 200 μm) were superimposed. Next, the positive electrode 2 and positive electrode collector 9 obtained as described above were superimposed on the separator so that the positive electrode 2 was contact with the separator. Next, a nonaqueous electrolyte solution was injected into the separator to thereby form an electrolyte layer 4.

As the nonaqueous electrolyte solution, 30 μL of a solution (produced by Kishida Chemical Co., Ltd.) prepared by dissolving lithium phosphate hexafluoride (LiPF$_6$) being used as a supporting electrolyte in a mixture solution prepared by mixing ethylene carbonate and diethyl carbonate at a mass ratio of 30:70, at a concentration of 1 mol/liter, was used.

Next, a stack comprising the negative electrode collector 10, negative electrode 3, electrolyte layer 4, positive electrode 2 and positive electrode collector 9, those being housed in the case body 6 was covered with an SUS lid 7 having a closed-end cylindrical shape and having an inner diameter of 15 mm. At this time, a ring-shaped insulating resin 8 composed of polytetrafluoroethylene (PTFE) having an outer diameter of 32 mm, an inner diameter of 30 mm and a thickness of 5 mm was provided and placed between the case body 6 and the lid 7 to thereby obtain a metal-oxygen cell 1 shown in FIG. 1. In the metal-oxygen cell 1, the positive electrode 2, negative electrode 3 and electrolyte layer 4 were hermetically sealed and housed in a case 5.

Next, the metal-oxygen cell 1 obtained in this Example was mounted on an electrochemical measurement device (manufactured by Toho Technical Research Co., Ltd.), and a current of 44 μA was applied between the negative electrode 3 and the positive electrode 2 to discharge the cell until the cell voltage reached 2.3V, with the use of an electric potential of Li$^+$/Li electrode reaction as a reference.

Next, the positive electrode 2 was taken out from the metal-oxygen cell 1 that had undergone discharging, and then washed using a mixture solution prepared by mixing ethylene carbonate and diethyl carbonate at a mass ratio of 30:70.

Next, after the washed positive electrode 2 was housed in a sample bottle in which 20 mL of a mixture solution prepared by mixing ethylene carbonate and diethyl carbonate at a mass ratio of 30:70 had been added, the sample bottle was washed by a ultrasonic cleaner, and a supernatant liquid containing deposits adhered on the surface of the positive electrode 2 was recovered.

The obtained supernatant liquid was subjected to solid-liquid separation using a polytetrafluoroethylene membrane filter (pore size: 1 μm), and the obtained solid was dried to thereby obtain a sample.

Next, a sample tube (diameter: 3 mm) was filled with the obtained sample, and the sample was subjected to solid $^7$Li nuclear magnetic resonance (solid $^7$Li-NMR) analysis. As measurement conditions for the NMR analysis, the magnetic field strength was set to 400 MHz, the sample rpm was set to 12 kHz, and as a spectrum external standard, 1 mol/L LiCl aqueous solution was used.

Figure 2:
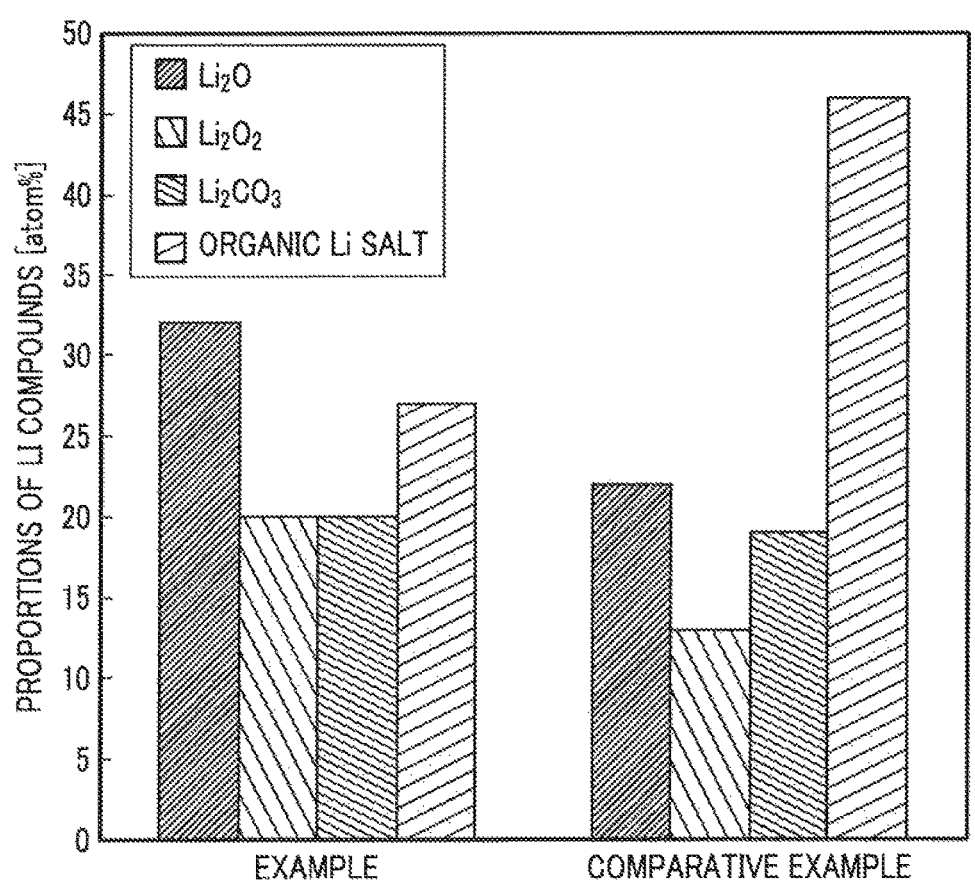
FIG. 2 is a graph showing proportions of Li compounds in metal-oxygen cells of an Example and a Comparative Example.

Then, by subjecting the obtained NMR spectrum to waveform separation, proportions of Li$_2$O, LI$_2$O$_2$, Li$_2$CO$_3$ and organic Li salt of Li compounds contained in the sample were calculated. The results are shown in FIG. 2.

Next, the metal-oxygen cell 1 obtained in this Example was mounted on the electrochemical measurement device, a current of 44 μA was applied between the negative electrode 3 and the positive electrode 2 to discharge the cell until the cell voltage reached 2.3V, with the use of an electric potential of Li$^+$/Li electrode reaction as a reference, followed by an open circuit period of 2 minutes, and thereafter a current of 22 μA was applied therebetween to charge the cell until the cell voltage reached 4.3V, with the use of an electric potential of Li$^+$/Li electrode reaction as a reference, thereby subjecting the cell to aging.

Figure 3:
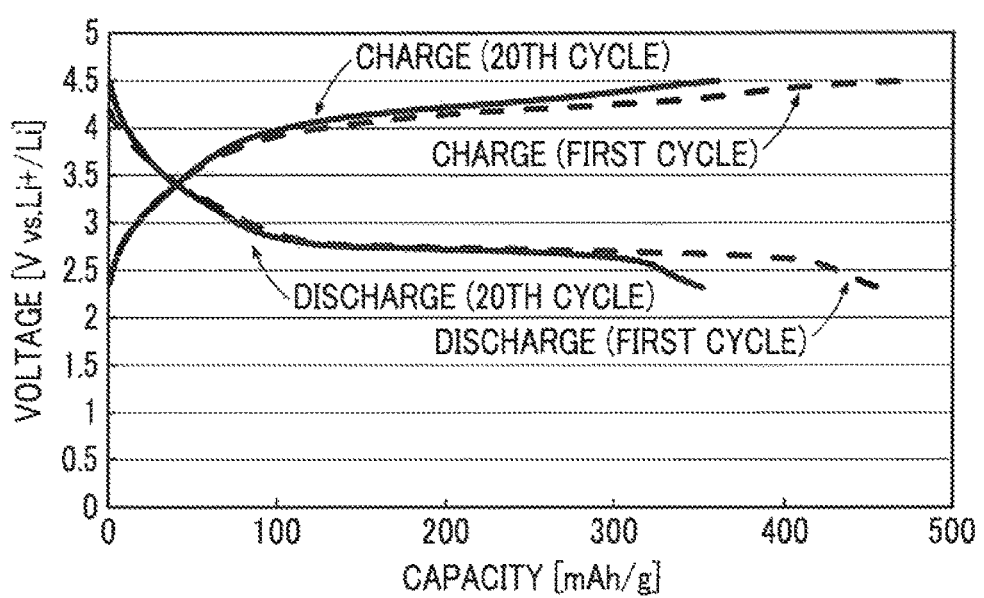
FIG. 3 is a graph showing cycle performance of the metal-oxygen cell of the Example.

After the aging, a current of 44 μA was applied between the negative electrode 3 and the positive electrode 2 to discharge the cell until the cell voltage reached 2.3V, thereafter, a current of 22 μA was applied therebetween to charge the cell until the cell voltage reached 4.3V, and this process was repeated for 20 cycles. At this time, an open circuit period of 2 minutes was interposed between discharging and charging and between charging and discharging. The obtained first cycle charge-discharge curve and 20th cycle charge-discharge curve are shown in FIG. 3.

Figure 4:
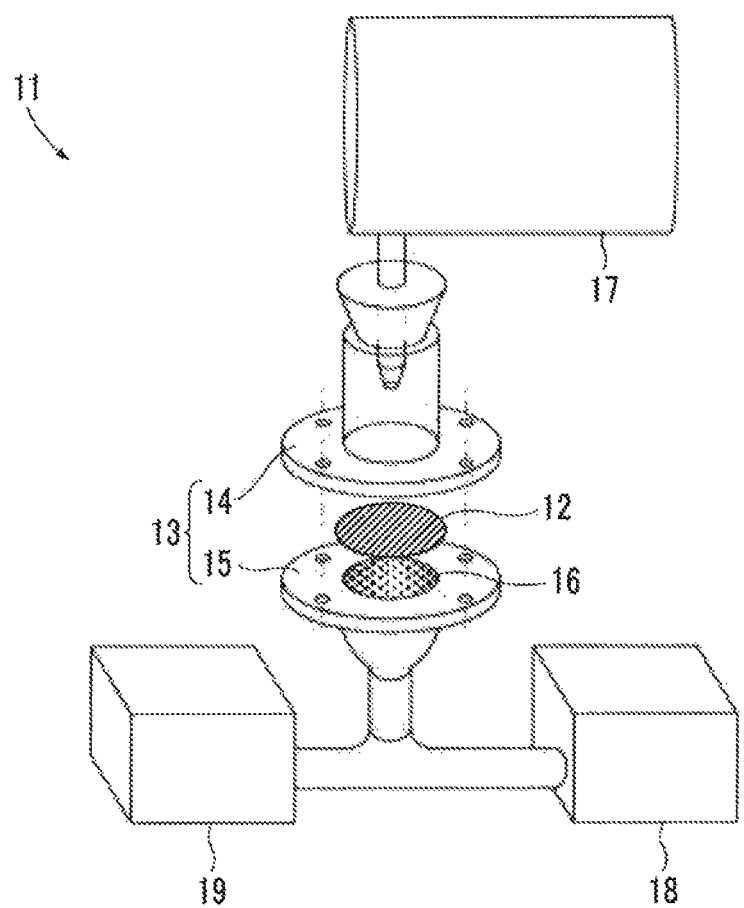
FIG. 4 is a schematic view showing a measurement device for measuring an oxygen permeability of a conductive polymer used in the metal-oxygen cell of the Example.

Next, an oxygen permeability of the conductive polymer comprising a PEDOT/DBS polymer used in the metal-oxygen cell 1 of this Example was determined using a measurement device 11 shown in FIG. 4.

First, a powdered conductive polymer comprising a PEDOT/DBS polymer was pressure-bonded to one surface of an SUS316 metal wire (mesh number: 500) having a diameter of 20 mm, followed by subjecting to electrolytic polymerization, to thereby prepare a sample piece 12. The sample piece was in a state where a coating film comprising the conductive polymer was formed on both surfaces thereof by the electrolytic polymerization, and in which voids between powders were embedded.

Next, the sample piece 12 was placed on a glass filter 16 provided between two chambers 14 and 15 of a gas permeation cell 13 of the measurement device 11 shown in FIG. 4, and a gap between the two chambers 14 and 15 was sealed by a Teflon seal tape so that atomic gas does not interrupt. Next, a preliminary exhausting was performed until the vacuum level of a vacuum indicator 19 placed between the gas permeation cell 13 and a vacuum pump 18 reached 50 Pa. Next, an oxygen bag 17 was depressurized by supplying oxygen gas from the oxygen bag 17 to the upstream of the gas permeation cell 13 while exhausting from the downstream of the gas permeation cell 13 by the vacuum pump 18 for 24 hours. The oxygen permeability was calculated using the equation $F=\delta V/(A \times \delta P \times T)$, from the amount of volume change of the oxygen bag 17, and it was found to be $4 \times 10^{-9}$ cm$^3$/(cm$^2$·s·Pa). In the equation, F is oxygen permeability (cm$^3$/(cm$^2$·s·Pa)), $\delta V$ is the amount of volume change (cm$^3$) of the oxygen bag 17, A is the cross-sectional area (cm$^2$) of the sample piece 12, $\delta P$ is a depressurization value (Pa) obtained by subtracting the vacuum level measured by the vacuum indicator 19 from the atmospheric pressure, and T is a time in which the vacuum level was maintained while supplying oxygen from the oxygen bag 17 to the gas permeation cell 13.

Next, with respect to the oxygen storage material used in the metal-oxygen cell 1 of this Example, an electrical conductivity was measured. The oxygen storage material comprises a composite metal oxide represented by chemical formula of $YMnO_3$, and at least a part of the surface is covered with a conductive polymer comprising a PEDOT/DBS polymer.

First, 300 mg of the oxygen storage material obtained in this Example was housed in a powder holder formed of a polyether ether ketone (PEEK) resin, in a state where the oxygen storage material was sandwiched, top and bottom, between both sides thereof, with an SUS316 metal plate having a diameter of 15 mm from both upper and lower sides, to thereby form sandwich electrodes.

Next, using the obtained sandwiched electrodes, the electrical conductivity was measured by the two-terminal measuring method, and found to be $2.8 \times 10^{-7}$ S/cm. The electrical conductivity is regarded as an electrical conductivity of the oxygen storage material obtained when the conductive polymer is present on the surface of the oxygen storage material.

Next, with respect to the oxygen storage material used in the metal-oxygen cell 1 of this Example, a lithium ion conductivity was measured using an impedance measurement device (Solartron Co., Model 1260) and was found to be $3 \times 10^{-6}$ S/cm. The lithium ion conductivity is regarded as a lithium ion conductivity of the oxygen storage material obtained when the conductive polymer is present on the surface of the oxygen storage material.

Next, with respect to the oxygen storage material used in the metal-oxygen cell 1 of this Example, a Young's modulus was measured by the nano-indentation method, and was found to be approximately 800 Pa. The Young's modulus is regarded as a Young's modulus of the oxygen storage material obtained when the conductive polymer is present on the surface of the oxygen storage material.

Comparative Example

In this Comparative Example, the oxygen storage material and the CMC aqueous solution were mixed to obtain a mixture in the same manner as in the Example except that the oxygen storage material was not covered with the conductive polymer.

Next, a positive electrode 2 and a metal-oxygen cell 1 were produced in the same manner as in the Example except that the obtained mixture was used.

Next, charging was performed in the same manner as in the Example except that the metal-oxygen cell 1 obtained in this Comparative Example was used, and thereafter, the positive electrode 2 was taken out.

Next, solid $^7$Li-NMR analysis was performed in the same manner as in the Example except that the obtained positive electrode 2 was used, and then proportions of Li compounds contained in the sample extracted from the positive electrode 2 were calculated. The results are shown in FIG. 2.

Figure 5:
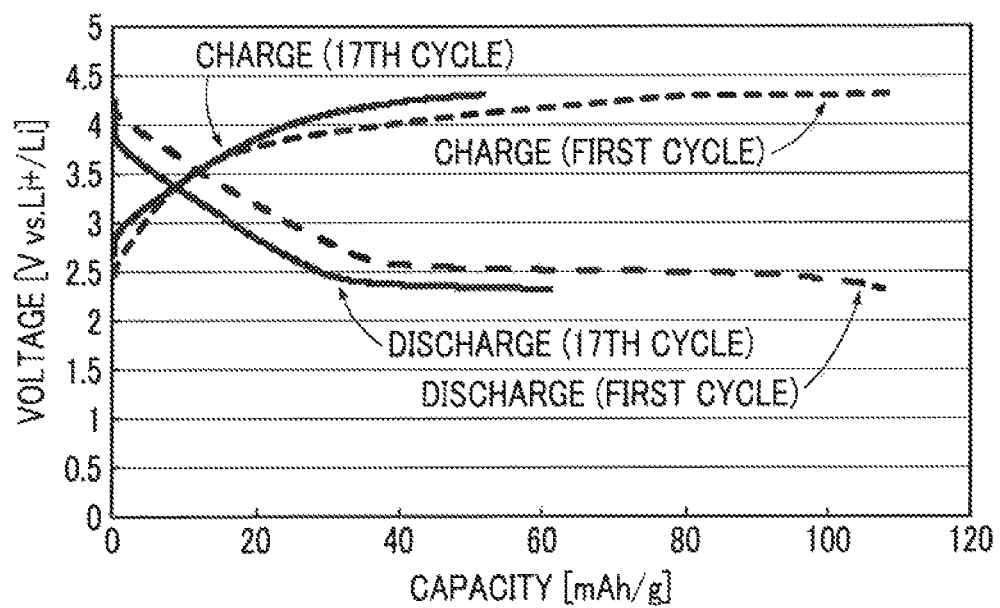
FIG. 5 is a graph showing cycle performance of the metal-oxygen cell of the Comparative Example.

Next, aging was performed in the same manner as in the Example except that the metal-oxygen cell 1 obtained in this Comparative Example was used, and then charging-discharging was repeated in the same manner as in the Example except that the number of cycles was 17 cycles. The obtained first cycle charge-discharge curve and 17th cycle charge-discharge curve are shown in FIG. 5.

Among Li compounds shown in FIG. 2, $Li_2O$ and $LI_2O_2$ are substances generated by cell reactions, i.e., substances generated by reactions between oxygen and lithium ions released from the oxygen storage material at the time of discharging, and these substances are decomposed by charging. Therefore, $Li_2O$ and $LI_2O_2$ correspond to reversible components decomposed by charging-discharging.

Meanwhile, $Li_2CO_3$ is a substance generated by reactions between $CO_2$ and lithium ions, those generated by decomposition of the electrolyte solution, and are not decomposed by charging-discharging. Organic Li salt is a substance generated by reactions between organic components and lithium ions, those generated by decomposition of the electrolyte solution, and are not decomposed by charging-discharging. Therefore, $Li_2CO_3$ and organic Li salt correspond to irreversible components which are not decomposed by charging-discharging.

It is clear from FIG. 2 that according to the metal-oxygen cell 1 of the Example, Li compounds contained in deposits deposited on the surface of the positive electrode 2 by discharging contain 32 atom % of $Li_2O$, 20 atom % of $LI_2O_2$, 20 atom % of $Li_2CO_3$ and 28 atom % of organic Li salt. Therefore, it is clear that among the Li compounds, the reversible components account for 52% in total, and the irreversible components account for 48% in total.

Meanwhile, it is clear that according to the metal-oxygen cell 1 of the Comparative Example, Li compounds contained in deposits deposited on the surface of the positive electrode 2 by discharging contain 22 atom % of $Li_2O$, 13 atom % of $LI_2O_2$, 19 atom % of $Li_2CO_3$ and 46 atom % of organic Li salt. Therefore, it is clear that among the Li compounds, the reversible components account for 35% in total, and the irreversible components account for 65% in total.

From the above, it is clear that according to the metal-oxygen cell 1 of the Example, it is possible to suppress decomposition of the electrolyte solution contained in the electrolyte layer 4, because the metal-oxygen cell 1 of the Example less contains the irreversible components as compared to the metal-oxygen cell 1 of the Comparative Example.

It is clear from FIG. 3 that according to the metal-oxygen cell 1 of the Example, the discharge capacity of the 20th cycle maintained 77% of the discharge capacity of the first cycle, and the charge capacity of the 20th cycle maintained 76% of the charge capacity of the first cycle. Further, it is clear that according to the metal-oxygen cell 1 of the Example, the discharge voltage of the 20th cycle was comparable with the discharge voltage of the first cycle.

In contrast, it is clear from FIG. 5 that according to the metal-oxygen cell 1 of the Comparative Example, the discharge capacity of the 17th cycle decreased to 55% of the discharge capacity of the first cycle, and the charge capacity of the 17th cycle decreased to 47% of the charge capacity of the first cycle. In addition, it is clear that according to the metal-oxygen cell 1 of the Comparative Example, the discharge voltage of the 17th cycle was lower than that of the first cycle.

From the above, it is clear that the metal-oxygen cell 1 of the Example has excellent cycle performance as compared to the metal-oxygen cell 1 of the Comparative Example.

REFERENCE SIGNS LIST

1 . . . metal-oxygen cell, 2 . . . positive electrode, 3 . . . negative electrode, 4 . . . electrolyte layer.

The invention claimed is:

1. A metal-oxygen cell comprising:
   a positive electrode that contains an oxygen storage material and uses oxygen as an active material;
   a negative electrode that uses a metal as an active material; and
   an electrolyte layer sandwiched between the positive electrode and the negative electrode and containing an electrolyte solution,
   wherein the metal-oxygen cell is configured to effect cell reactions of the positive electrode on a surface of the oxygen storage material,
   wherein the positive electrode contains a conductive polymer that is capable of suppressing permeation of oxygen and capable of conducting metal ions and covers at least a part of the surface of the oxygen storage material, and
   wherein the conductive polymer is poly(3,4-ethylenedioxythiophene) containing a dodecylbenzene sulfonic acid as a dopant.

2. The metal-oxygen cell according to claim 1, wherein the oxygen storage material has catalytic ability with respect to cell reactions.

3. The metal-oxygen cell according to claim 1, wherein the oxygen storage material is a composite metal oxide containing Y and Mn.

4. The metal-oxygen cell according to claim 1, wherein the positive electrode contains a conductive assistant having electron conductivity.

5. The metal-oxygen cell according to claim 1, wherein the negative electrode comprises any one of a metal selected from a group consisting of Li, Zn, Al, Mg, Fe, Ca, Na, and K, an alloy of the metal, an organometal compound containing the metal and an organic complex of the metal.

* * * * *